(12) United States Patent
Kigawa

(10) Patent No.: US 11,410,409 B2
(45) Date of Patent: Aug. 9, 2022

(54) IMAGE CLASSIFICATION SYSTEM AND METHOD, CLASSIFICATION DATA CREATION SYSTEM AND METHOD, AND STORAGE MEDIUM

(71) Applicant: NITTO DENKO CORPORATION, Ibaraki (JP)

(72) Inventor: Yoichi Kigawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 555 days.

(21) Appl. No.: 15/985,950

(22) Filed: May 22, 2018

(65) Prior Publication Data

US 2018/0341829 A1 Nov. 29, 2018

(30) Foreign Application Priority Data

May 26, 2017 (JP) .............................. JP2017-104449

(51) Int. Cl.
*G06V 10/44* (2022.01)
*G06K 9/62* (2022.01)
*G06N 3/04* (2006.01)
*G06N 3/08* (2006.01)
*G06N 5/04* (2006.01)
(Continued)

(52) U.S. Cl.
CPC ........... *G06V 10/44* (2022.01); *G06K 9/6256* (2013.01); *G06K 9/6271* (2013.01); *G06N 3/0454* (2013.01); *G06N 3/08* (2013.01); *G06N 5/046* (2013.01); *G06V 10/454* (2022.01); *G06V 20/00* (2022.01)

(58) Field of Classification Search
CPC ............. G06K 9/4604; G06K 9/00624; G06K 9/6271; G06K 9/4628; G06K 9/6256; G06K 9/6267; G06N 3/0454; G06N 3/08; G06N 5/046
See application file for complete search history.

(56) References Cited

U.S. PATENT DOCUMENTS 9,767,381 B2    9/2017    Rodriguez-Serrano et al.
9,911,067 B2    3/2018    Hikida
(Continued)

FOREIGN PATENT DOCUMENTS

JP    2016-33806 A    3/2016
JP    2016-115248 A    6/2016
JP    2017-62781 A    3/2017

OTHER PUBLICATIONS

Office Action dated Mar. 27, 2020, issued in counterpart JP Application No. 2017-104449, with English translation (6 pages).
(Continued)

*Primary Examiner* — John W Lee
(74) *Attorney, Agent, or Firm* — WHDA, LLP

(57) ABSTRACT

Provided is an image classification system for classifying an input image including: a network constructed so that feature amount extraction processing and fully connected processing are executed on input image data; a path extracting means configured to extract a processing path in the network; and a determination module configured to compare the processing path extracted by the path extracting means and a plurality of setting paths set in advance in association with classes to set a class associated with a matched path as a class of the input image.

4 Claims, 11 Drawing Sheets

(51) Int. Cl.
*G06V 20/00* (2022.01)
*G06V 10/82* (2022.01)
*G06V 20/40* (2022.01)

(56) References Cited

U.S. PATENT DOCUMENTS

2015/0332126 A1* 11/2015 Hikida ................. H04N 5/2353
　　　　　　　　　　　　　　　　　　　　　　　348/223.1
2017/0083792 A1* 3/2017 Rodríguez-Serrano ......................
　　　　　　　　　　　　　　　　　　　　　　　G06T 7/74
2018/0247113 A1* 8/2018 Yang ...................... G06V 10/82
2018/0330198 A1* 11/2018 Harary ................... G06V 20/36

OTHER PUBLICATIONS

Office Action dated Apr. 23, 2022, issued in counterpart KR Application No. 10-2018-0054177, with English Translation. (6 pages).

* cited by examiner

IMAGE CLASSIFICATION SYSTEM AND METHOD, CLASSIFICATION DATA CREATION SYSTEM AND METHOD, AND STORAGE MEDIUM

CROSS-REFERENCE TO RELATED APPLICATION

This application claims priority to Japanese Patent Application No. 2017-104449, filed on May 26, 2017, the disclosure of which is incorporated herein by reference in its entirety.

BACKGROUND OF THE INVENTION

Field of the Invention

The present invention relates to an image classification system and method, a classification data creation system and method, and a storage medium.

Background Art

Hitherto, image recognition processing using a convolutional neural network (CNN) has been performed. The convolutional neural network of this type is constructed so that, for example, convolution processing and pooling processing are alternately executed as feature amount extraction processing and fully connected processing is executed on the stage subsequent to the feature amount extraction processing. As the convolution processing, convolution processing using a plurality of filters subjected to learning is performed on input image data, to thereby extract a feature amount included in the image data. As the pooling processing following the convolution processing, pooling processing for outputting a maximum value or a mean value as a feature amount from areas of several neighboring pixels within a feature amount map obtained by the convolution processing is performed through use of a plurality of filters subjected to learning, and by this processing, a minute change in feature amount is absorbed. As the fully connected processing, fully connected processing using a plurality of units subjected to learning is performed on feature amounts extracted by the convolution processing and the pooling processing, to thereby classify a target object included in the image data (JP 2016-115248 A).

When the convolutional neural network is adapted to, for example, a system for determining based on an image whether a product is a conforming article or a defective article, sufficient caution is required. That is, the convolutional neural network can exhibit a relatively high identification rate. However, unless an identification rate high enough to prevent the occurrence of such "overlooking" as to erroneously determine a defective article as a conforming article (namely, such an identification rate as to minimize the number of occurrences of "overlooking" to a level extremely close to zero) can be exhibited, it is difficult in terms of accuracy to adapt the convolutional neural network to the system for determining whether a product is a conforming article or a defective article. Further, in order to subject an image including a defective article erroneously determined as a conforming article to the determination again so that the product is determined as a defective article, it is required to construct the network again back from a learning stage and to verify the network. Therefore, it is also difficult from an operational aspect to adapt the convolutional neural network to the system for determining whether a product is a conforming article or a defective article.

SUMMARY OF THE INVENTION

The present invention has been made in view of the above-mentioned circumstances, and has an object to provide an image classification system and method, a classification data creation system and method, and a storage medium, which are capable of classifying an image with sufficient accuracy.

An image classification system according to one embodiment of the present invention is a system for classifying an input image, which includes: a network constructed so that feature amount extraction processing and fully connected processing are executed on input image data; path extracting means for extracting a processing path in the network; and a determination module configured to compare the processing path extracted by the path extracting means and a plurality of setting paths set in advance in association with classes to set a class associated with a matched path as a class of the input image.

According to one or more embodiments of the present invention, in the image classification system having the above-mentioned configuration, the path extracting means is configured to extract a path connecting at least one feature value selected from a plurality of feature values obtained by the feature amount extraction processing performed in the network and at least one fully connected output value selected from a plurality of fully connected output values obtained by the fully connected processing performed in the network, and at least one of the selected at least one feature value or the selected at least one fully connected output value includes a maximum value.

According to one or more embodiments of the present invention, in the image classification system having the above-mentioned configuration, the path extracting means is configured to extract a path connecting at least one feature value selected from a feature value group including a plurality of feature values obtained by the feature amount extraction processing and at least one fully connected output value selected from a fully connected output value group including a plurality of fully connected output values obtained by the fully connected processing, the path extracting means is configured to select at least two values from at least one of the feature value group or the fully connected output value group, and the at least two values include a maximum value among a plurality of values included in the at least one of the value groups from which selection is made. An image classification method according to one embodiment of the present invention is an image classification method for classifying an input image, and the method includes: a network processing step of executing feature amount extraction processing and fully connected processing on input image data; extracting a processing path in the network processing step; and determining by comparing the processing path extracted by the path extracting means and a plurality of setting paths set in advance in association with classes to set a class associated with a matched path as a class of the input image.

A classification data creation system according to one embodiment of the present invention is a classification data creation system for creating classification data for an image classification device, and the system includes: a network constructed so that feature amount extraction processing and fully connected processing are executed on input image data; setting path extracting means for extracting, as a setting path, a path connecting at least one feature value selected from a feature value group including a plurality of feature values obtained by the feature amount extraction processing performed in the network and at least one fully connected output value selected from a fully connected output value group including a plurality of fully connected output values obtained by the fully connected processing performed in the network, the at least one feature value and the at least one fully connected output value being selected so that a value selected from at least one of the feature value group or the fully connected output value group includes a maximum value among a plurality of values included in the at least one of the value groups from which selection is made; and association means for associating the extracted setting path and a class for classifying an image with each other.

A classification data creation method according to one embodiment of the present invention is a method of creating classification data for an image classification device, the method including: a network processing step of executing feature amount extraction processing and fully connected processing on input image data; extracting, as a setting path, a path connecting at least one feature value selected from a feature value group including a plurality of feature values obtained by the feature amount extraction processing performed in the network processing step and at least one fully connected output value selected from a fully connected output value group including a plurality of fully connected output values obtained by the fully connected processing performed in the network processing step, the at least one feature value and the at least one fully connected output value being selected so that a value selected from at least one of the feature value group or the fully connected output value group includes a maximum value among a plurality of values included in the at least one of the value groups from which selection is made; and associating the extracted setting path and a class for classifying an image with each other. A storage medium according to one embodiment of the present invention is a storage medium for storing a program configured to cause at least one computer to function as the above-mentioned image classification system and/or the above-mentioned classification data creation system.

DETAILED DESCRIPTION OF THE PREFERRED EMBODIMENTS

Now, an image classification system and method, a classification data creation system and method, and a storage medium according to an embodiment of the present invention are described with reference to the accompanying drawings.

First, the image classification program according to this embodiment is described.

Figure 1:
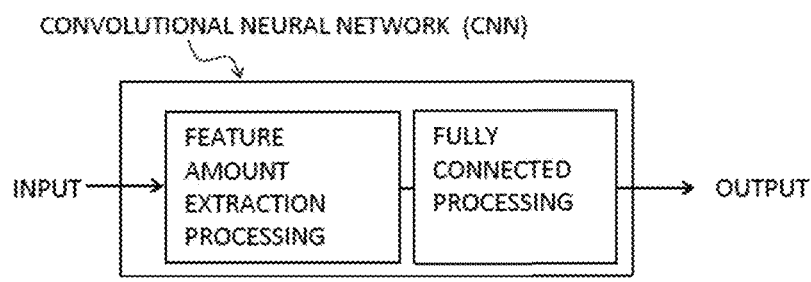
FIG. 1 is a block diagram for illustrating processing executed by an image classification program according to an embodiment of the present invention.

As illustrated in FIG. 1, the image classification program according to this embodiment is a program for classifying an input image, and causes at least one computer to function as: a network constructed so that feature amount extraction processing and fully connected processing are executed on input image data; path extracting means for extracting a processing path in the network; and a determination module configured to compare the processing path extracted by the path extracting means and a plurality of setting paths set in advance in association with classes to set a class associated with a matched path as a class of the input image.

The image classification program according to this embodiment is a program for classifying an input image. There is no particular limitation imposed on the image to be input as long as the image includes a classification target object.

The image classification program according to this embodiment causes at least one computer to function as the network constructed so that the feature amount extraction processing and the fully connected processing are executed on the input image data.

The description of this embodiment is directed to a mode of employing a convolutional neural network as an example of the network constructed so that the feature amount extraction processing and the fully connected processing are executed, but the network to be employed in this embodiment is not particularly limited thereto.

Now, general processing of the convolutional neural network is described.

The convolutional neural network is often used in the image recognition field, and is applied to an image recognition technology for recognizing a predetermined shape or pattern from the image data that is input data. In the convolutional neural network, at least convolution processing using a filter is performed on a two-dimensional image, to thereby extract a feature amount from the input image data.

The convolutional neural network is formed of a multi-layer network including: a feature amount extraction layer for repeating a layer for executing convolution processing and a layer for executing pooling processing; and a fully connected layer for executing fully connected processing. In the convolutional neural network, a coefficient of a filter effective for extracting the feature amount, which is used in the execution of the convolution processing, is learned through use of data for learning (data for training) including images for learning (image group for learning). The coefficient of the filter is learned to be obtained by repeating the convolution processing using the filter and the pooling processing for summing up convolution processing results for a given area through use of the data for training.

As the convolution processing, convolution processing (convolution operation) using a filter subjected to learning is performed on image data input from the previous layer, to thereby extract a feature amount included in the image data. As the pooling processing following the convolution processing, pooling processing for outputting a maximum value or a mean value from areas of about several pixels adjacent to each other within a feature amount map obtained by the convolution processing is performed, and by this processing, the areas are combined together to extract the feature amount. Irrespective of reduction in positional sensitivity, the pooling processing improves recognition performance with respect to a position change, to thereby absorb a minute change in feature amount.

In the convolutional neural network, the processing based on the convolution processing and the pooling processing is repeatedly performed in the above-mentioned manner, to thereby extract the feature amount with higher accuracy.

In the fully connected processing, feature amounts obtained by the convolution processing and the pooling processing are connected to output finally processed data.

Figure 2:
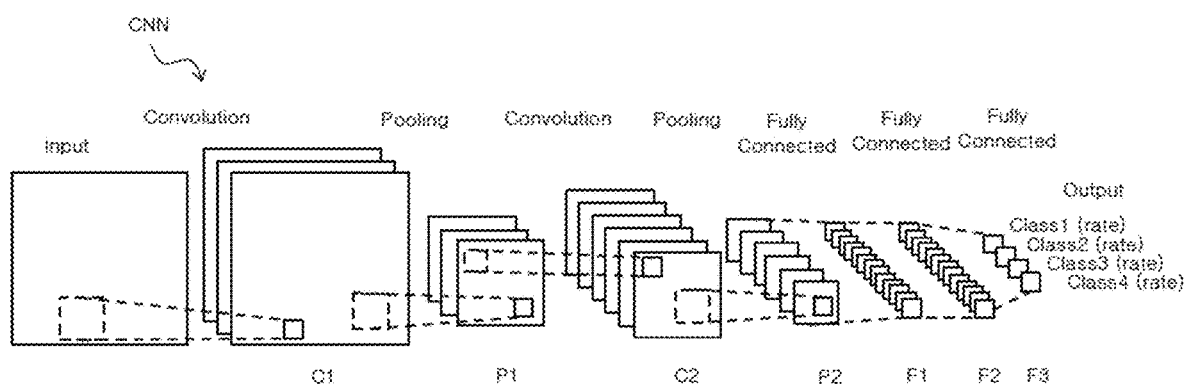
FIG. 2 is a diagram for schematically illustrating a flow of processing performed in a general convolutional neural network.

A convolutional neural network CNN illustrated in FIG. 2 includes a convolution layer C for executing convolution processing on input image data, a pooling layer P for executing pooling processing, and a fully connected layer F for executing fully connected processing.

At least one convolution layer C is provided. In FIG. 2, two convolution layers C1 and C2 are provided. Each convolution layer C includes a plurality of filters. In the convolution layer C, known convolution processing is executed on the image data input from the previous layer to output the processing result (data). A plurality of convolution layers C may be provided in series on the stage previous to the pooling layer P.

In the first convolution layer C1 (on the first stage), the convolution processing is performed on image data D input from the outside of a device to output the processing result (data) to the pooling layer P1. In the following second convolution layer C2 (on the last stage), the convolution processing is performed on the processing result (data) input from the pooling layer P1 to output the processing result to the pooling layer P2.

At least one pooling layer P is provided. In FIG. 2, two pooling layers P1 and P2 are provided. Each pooling layer P includes a plurality of filters. A configuration including no pooling layer P may be employed. In the pooling layer P, known pooling processing is executed on the processing result (data) obtained from the convolution layer C to output the processing result (data). In the first pooling layer P1 (on the first stage), the pooling processing is performed on the processing result (data) input from the convolution layer C1 to output the processing result (data) to the convolution layer C2. In the following second pooling layer P2 (on the last stage), the pooling processing is performed on the processing result (data) input from the convolution layer C2 to output the processing result (data) to the fully connected layer F.

At least one fully connected layer F is provided. In FIG. 2, three fully connected layers F1, F2, and F3 are provided. Each fully connected layer F includes a plurality of units. In the fully connected layer F, known fully connected processing is executed on the processing result obtained from the just previous pooling layer P (pooling layer P on the last stage) to output the processing result (data). In the first fully connected layer F1 (on the first stage), the fully connected processing is performed on the processing result (data) input from the pooling layer P2 to output the processing result (data) to the fully connected layer F2. In the following second fully connected layer F2, the fully connected processing is performed on the processing result (data) input from the fully connected layer F1 to output the processing result (data) to the fully connected layer F3. In the following third fully connected layer F3 (on the last stage), the processing result is classified as to which class the image belongs to, and the classified processing result is output as an identification result.

In FIG. 2, the convolution layer C and the pooling layer P form a set, and the sets are linked to each other stepwise.

Next, a flow of general processing performed in the convolutional neural network CNN of FIG. 2 is described with reference to FIG. 3 and FIG. 4. Each kind of processing is executed by a feature amount extraction calculation module of an image classification system.

Figure 3:
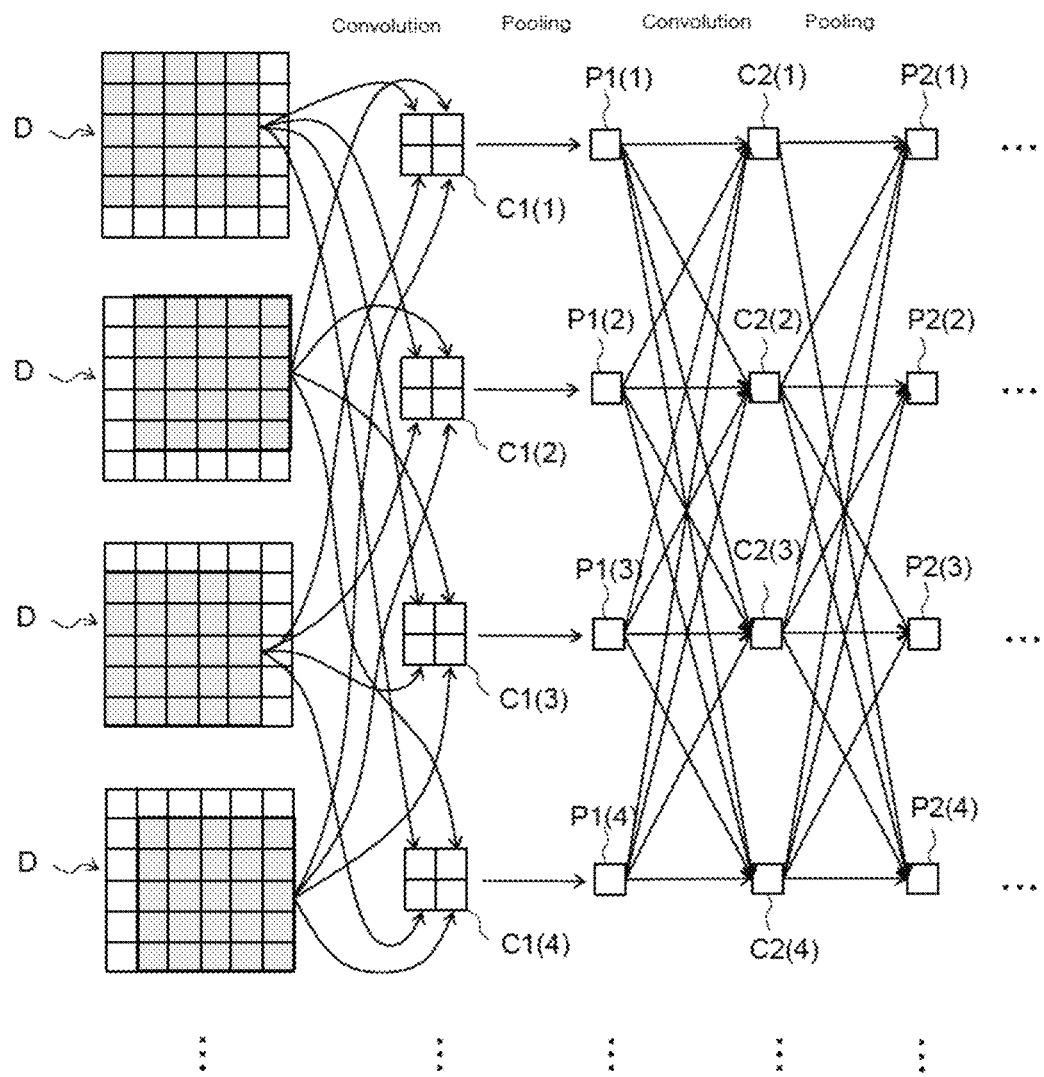
FIG. 3 is a diagram for schematically illustrating a general flow of feature amount extraction processing.

As illustrated in FIG. 3, in the processing performed in the first convolution layer C1, the input image data D is scanned by, for example, a raster scan for every predetermined pixel size, for example, for every 5×5 pixels hatched in FIG. 3. The pixel size used for the scanning is not limited to 5×5 pixels, and can be changed appropriately. Then, the known convolution processing is performed on the scanned data, and processing results C1(1), C1(2) . . . are set as output data pieces from the first convolution layer C1.

In the processing performed in the first pooling layer P1, the known pooling processing is performed on each of the output data pieces C1(1), C1(2), . . . input from the first convolution layer C1 for every predetermined pixel size, in this case, for every 2×2 pixels, and processing results P1(1), P1(2), . . . are set as output data pieces from the pooling layer P1. The pixel size used for the scanning is not limited to 2×2 pixels, and can be changed appropriately. The above-mentioned convolution processing and pooling processing are performed to extract the feature amount included in the input image data D.

In the same manner, in the processing performed in the second convolution layer C2, the output data pieces P1(1), P1(2), . . . input from the first pooling layer P1 that is the previous layer are each scanned for every predetermined pixel size. Then, the known convolution processing is performed on the scanned data, and processing results C2(1), C2(2), . . . are set as output data pieces from the second convolution layer C2. Then, in the processing performed in the second pooling layer P2, the known pooling processing is performed on each of the output data pieces C2(1), C2(2), . . . input from the second convolution layer C2 for every predetermined pixel size, and processing results P2(1), P2(2), . . . are set as output data pieces from the second pooling layer P2. The above-mentioned convolution processing and pooling processing are performed to further extract the feature amount included in the input image data D.

In this manner, the processing performed in the plurality of convolution layers C1, C2, . . . and the processing performed in the plurality of pooling layers P1, P2, . . . are repeated, to thereby extract various feature amounts included in the image data D, and the finally extracted feature amount is output to the fully connected layer F.

Figure 4:
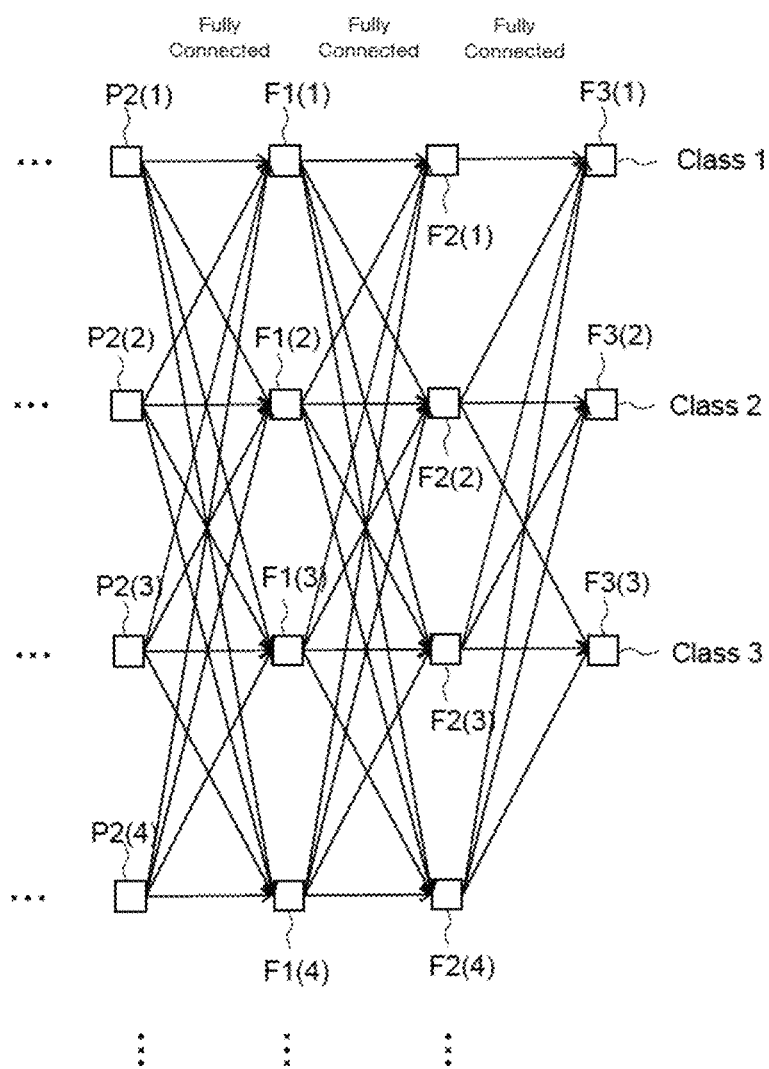
FIG. 4 is a diagram for illustrating schematically illustrating a general flow of fully connected processing.

As illustrated in FIG. 4, in the processing performed in the first fully connected layer F1, known fully connected processing is executed to perform a product-sum operation on the plurality of output data pieces P2(1), P2(2), . . . input from the second pooling layer P2 that is the previous layer while changing a weighting factor, and processing results F1(1), F1(2), . . . are set as output data pieces from the first fully connected layer F1.

In the processing performed in the second fully connected layer F2, the known fully connected processing is executed to perform a product-sum operation on the plurality of output data pieces F1(1), F1(2), . . . input from the first fully connected layer F1 that is the previous layer while changing the weighting factor, and processing results F2(1), F2(2), . . . are set as output data pieces from the second fully connected layer F2.

In the processing performed in the third fully connected layer F3, the known fully connected processing is executed to perform a product-sum operation on the plurality of output data pieces F2(1), F2(2), . . . input from the second fully connected layer F2 being the previous layer while changing the weighting factor, and processing results F3(1), F3(2), . . . are set as output data pieces from the third fully connected layer F3. Output data pieces F3(1), F3(2), . . . output from the third fully connected layer F3 correspond to classification results (in this case, three classes of Class 1, Class 2, and Class 3) of a desired image.

In a related-art image classification program, the respective kinds of processing are executed in the convolutional neural network by following a path passing through all the filters of the layers for executing the feature amount extraction processing and passing through all the units of the layers for executing the fully connected processing, and numerical values finally output from a fully connected module are relatively compared with each other, to thereby classify an image. However, when the image is processed in the above-mentioned manner, it is difficult to classify an image with sufficient accuracy as described later in Examples.

In view of the foregoing, the image classification program according to this embodiment causes at least one computer to function as: path extracting means for extracting a processing path in the convolutional neural network; and a determination module configured to compare the processing path extracted by the path extracting means and a plurality of setting paths set in advance in association with classes to set a class associated with the matched path as the class of the input image.

Figure 5:
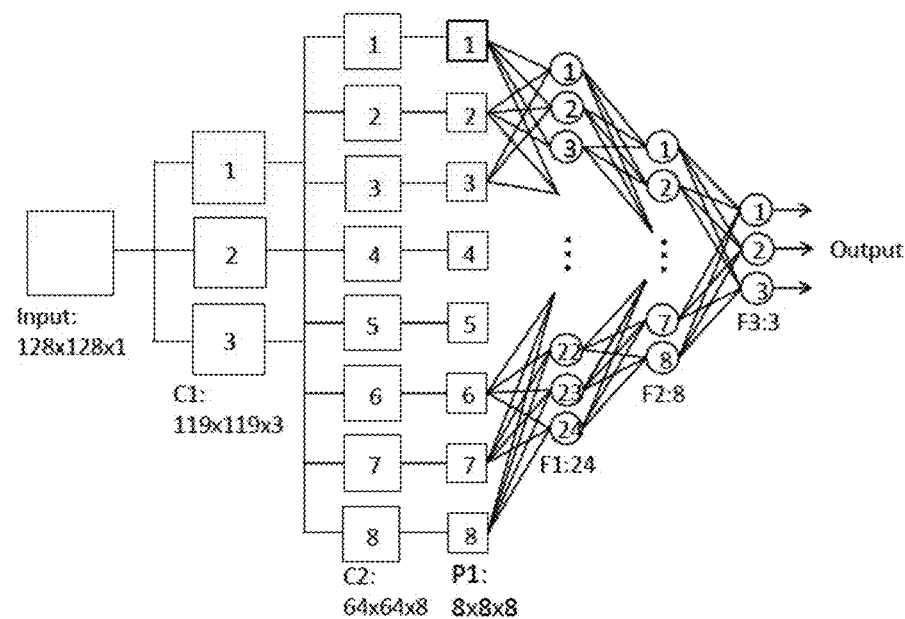
FIG. 5 is a diagram for schematically illustrating all paths within a convolutional neural network used for the image classification program according to this embodiment.

For example, in the convolutional neural network illustrated in FIG. 5, the convolutional neural network CNN includes the two consecutive convolution layers C (C1 and C2), the one pooling layer P (P1) on the subsequent stage, and the three consecutive fully connected layers F (F1, F2, and F3) on the subsequent stage. The convolution layer C1 includes three filters, the convolution layer C2 includes eight filters, the pooling layer P1 includes eight filters, the fully connected layer F1 includes 24 units, the fully connected layer F2 includes eight units, and the fully connected layer F3 includes three units. The above-mentioned convolution layers C, pooling layer P, and fully connected layers F form the convolutional neural network CNN.

In this embodiment, a plurality of setting paths are set in advance in association with classes in the convolutional neural network CNN formed in the above-mentioned manner. The setting paths are extracted by, for example, setting path extracting means described later.

The image classification program according to this embodiment causes at least one computer to function as the path extracting means for extracting a processing path in the convolutional neural network CNN described above. The image classification program according to this embodiment further causes at least one computer to function as the determination module configured to compare the processing path extracted by the path extracting means and a plurality of setting paths set in advance in association with classes to set a class associated with the matched path as the class of the input image.

Specifically, in this embodiment, the path extracting means is configured to extract a path connecting at least one feature value selected from a plurality of feature values obtained by the feature amount extraction processing performed in the network and at least one fully connected output value selected from a plurality of fully connected output values obtained by the fully connected processing performed in the network, and at least one of the selected feature value or the selected fully connected output value includes a maximum value.

In this case, the feature value is a representative value among values included in a feature amount obtained by each filter, which enables a comparison with the feature amount obtained by another filter in the same layer, and examples of the feature value include a maximum value, a mean value, and an intermediate value.

Examples of such a path include: a path connecting the maximum value among the plurality of feature values obtained by the feature amount extraction processing and at least one value selected from the plurality of fully connected output values obtained by the fully connected processing; and a path connecting at least one value selected from the plurality of feature values obtained by the feature amount extraction processing and the maximum value among the plurality of fully connected output values obtained by the fully connected processing.

In addition, examples of the above-mentioned path include a path connecting each of the maximum value and the second largest value among the plurality of feature values obtained by the feature amount extraction processing and at least one value selected from the plurality of fully connected output values obtained by the fully connected processing.

Further, examples of the above-mentioned path include a path connecting at least one value selected from the plurality of feature values obtained by the feature amount extraction processing and each of the maximum value and the second largest value among the plurality of fully connected output values obtained by the fully connected processing.

It is to be understood that the path extracting means may extract a path of another kind.

For example, in FIG. 6 to FIG. 9, the path extracting means extracts, in the above-mentioned manner, a path connecting at least one feature value selected from a plurality of feature values obtained by the processing based on the plurality of filters of the pooling layer P1 and at least one fully connected output value selected from a plurality of fully connected output values obtained by processing based on the plurality of units of the fully connected layer F1.

More specifically, in this embodiment, as indicated by the thick lines in FIG. 6 to FIG. 9, the path extracting means is configured to extract a path connecting at least one feature value selected from a feature value group including a plurality of feature values obtained by the feature amount extraction processing and at least one fully connected output value selected from a fully connected output value group including a plurality of fully connected output values obtained by the fully connected processing, and extracts the path, for example, in the above-mentioned manner, by selecting at least two values from at least one of the feature value group or the fully connected output value group so that the two values include a maximum value among a plurality of values included in the at least one of the value groups from which selection is made.

Figure 6:
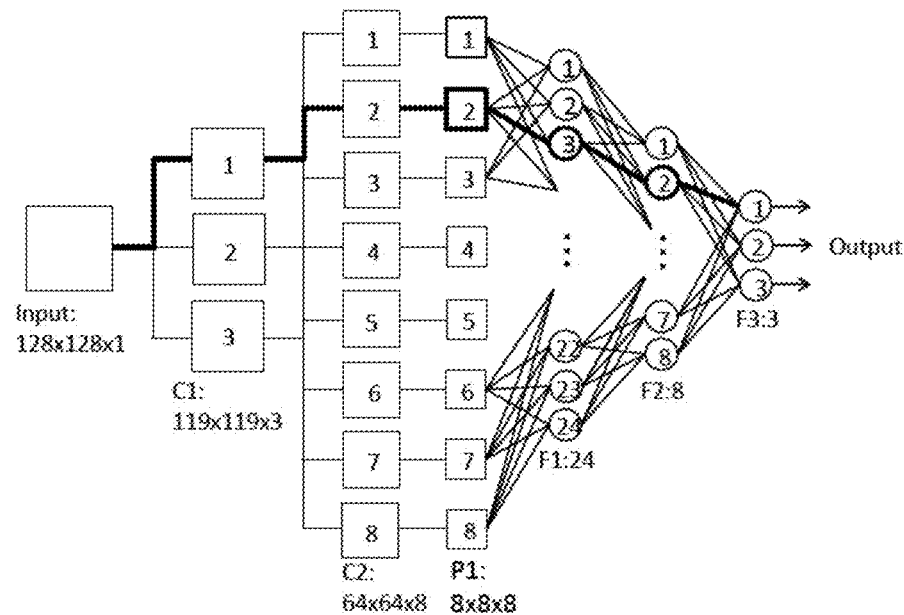
FIG. 6 is a schematic diagram for illustrating an example of extracted paths.
Figure 9:
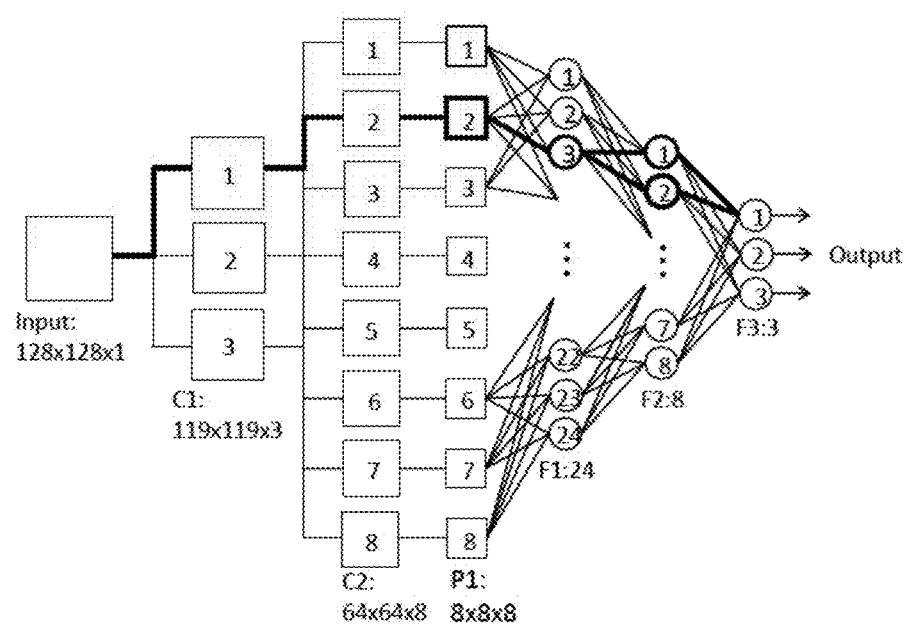
FIG. 9 is a schematic diagram for illustrating an example of extracted paths.

Examples of such a path include, as indicated by the thick lines in FIG. 6 and FIG. 9: a path connecting the maximum value selected from the feature value group including the plurality of feature values obtained by the feature amount extraction processing and the maximum value selected from the fully connected output value group including the plurality of fully connected output values obtained by the fully connected processing; a path connecting the maximum value selected from the feature value group including the plurality of feature values obtained by the feature amount extraction processing and the second largest value selected from the fully connected output value group including the plurality of fully connected output values obtained by the fully connected processing; a path connecting the second largest value selected from the feature value group including the plurality of feature values obtained by the feature amount extraction processing and the maximum value selected from the fully connected output value group including the plurality of fully connected output values obtained by the fully connected processing; and a path connecting the second largest value selected from the feature value group including the plurality of feature values obtained by the feature amount extraction processing and the second largest value selected from the fully connected output value group including the plurality of fully connected output values obtained by the fully connected processing.

Figure 7:
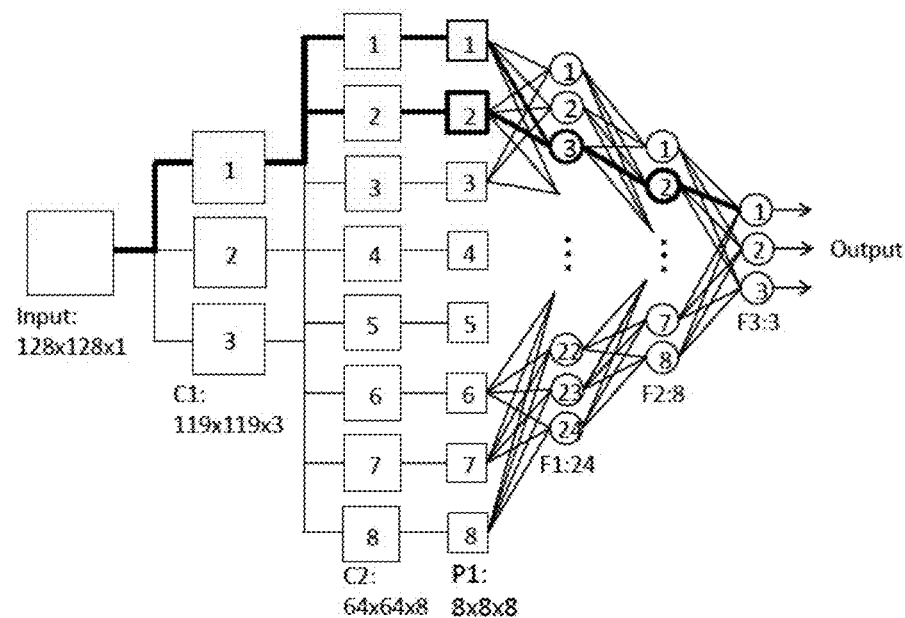
FIG. 7 is a schematic diagram for illustrating an example of extracted paths.

In addition, examples of the above-mentioned path include, as indicated by the thick lines in FIG. 7: a path connecting each of the maximum value and the second largest value selected from the feature value group including the plurality of feature values obtained by the feature amount extraction processing and the maximum value selected from the fully connected output value group including the plurality of fully connected output values obtained by the fully connected processing; and a path connecting each of the maximum value and the second largest value selected from the feature value group including the plurality of feature values obtained by the feature amount extraction processing and the second largest value selected from the fully connected output value group including the plurality of fully connected output values obtained by the fully connected processing.

Figure 8:
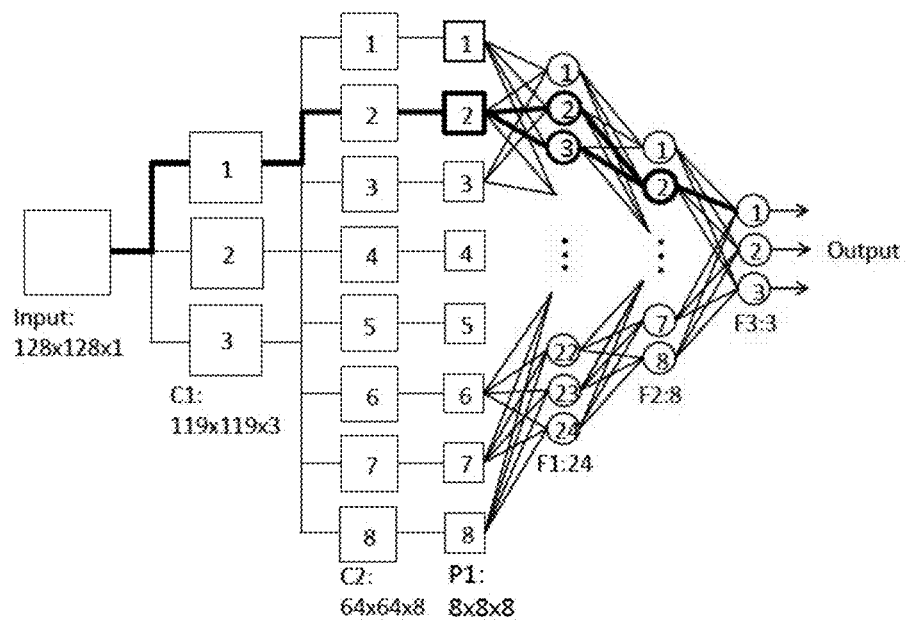
FIG. 8 is a schematic diagram for illustrating an example of extracted paths.

In addition, examples of the above-mentioned path include, as indicated by the thick lines in FIG. 8: a path connecting the maximum value selected from the feature value group including the plurality of feature values obtained by the feature amount extraction processing and each of the maximum value and the second largest value selected from the fully connected output value group including the plurality of fully connected output values obtained by the fully connected processing; and a path connecting the second largest value selected from the feature value group including the plurality of feature values obtained by the feature amount extraction processing and each of the maximum value and the second largest value selected from the fully connected output value group including the plurality of fully connected output values obtained by the fully connected processing.

For example, in FIG. 6 to FIG. 9, the path extracting means extracts a path connecting at least one feature value selected from the feature value group including the plurality of feature values obtained by the processing based on the plurality of filters of the pooling layer P1 and at least one fully connected output value selected from the fully connected output value group including the plurality of fully connected output values obtained by the processing based on the plurality of units of the fully connected layer F1, and extracts the path, for example, in the above-mentioned manner, by selecting at least two values from at least one of the feature value group or the fully connected output value group so that the two values include the maximum value among the plurality of values included in the at least one of the value groups from which selection is made.

In addition, in this embodiment, as indicated by the thick lines in FIG. 6 to FIG. 9, the path extracting means extracts paths between the fully connected layers F, that is, between the fully connected layer F1 and the fully connected layer F2 and between the fully connected layer F2 and the fully connected layer F3, in the same manner as the above-mentioned manner in which the path is extracted between the pooling layer P1 and the fully connected layer F1.

In regard to the segment between the fully connected layer F1 and the fully connected layer F2, specifically, the path extracting means extracts a path connecting at least one fully connected output value selected from the plurality of fully connected output values obtained by the processing based on the plurality of units of the fully connected layer F1 and at least one fully connected output value selected from a plurality of fully connected output values obtained by processing based on the plurality of units of the fully connected layer F2. More specifically, the path extracting means extracts a path connecting at least one fully connected output value selected from the fully connected output value group (first fully connected output value group) including the plurality of fully connected output values obtained by the processing based on the plurality of units of the fully connected layer F1 and at least one fully connected output value selected from the fully connected output value group (second fully connected output value group) including the plurality of fully connected output values obtained by the processing based on the plurality of units of the fully connected layer F2, and extracts the path by selecting at least two values from at least one of the first fully connected output value group or the second fully connected output value group so that the two values include the maximum value among the plurality of values included in the at least one of the value groups from which selection is made.

In regard to the segment between the fully connected layer F2 and the fully connected layer F3, the path extracting means extracts a path connecting at least one fully connected output value selected from the plurality of fully connected output values obtained by the processing based on the plurality of units of the fully connected layer F2 and at least one fully connected output value selected from a plurality of fully connected output values obtained by processing based on the plurality of units of the fully connected layer F3. More specifically, the path extracting means extracts a path connecting at least one fully connected output value selected from the fully connected output value group (second fully connected output value group) including the plurality of fully connected output values obtained by the processing based on the plurality of units of the fully connected layer F2 and at least one fully connected output value selected from the fully connected output value group (third fully connected output value group) including the plurality of fully connected output values obtained by the processing based on the plurality of units of the fully connected layer F3, and extracts the path by selecting at least two values from at least one of the second fully connected output value group or the third fully connected output value group so that the two values include the maximum value among the plurality of values included in the at least one of the value groups from which selection is made.

It is to be understood that the path extracting means may extract a path of another kind.

Further, in the convolutional neural network illustrated in FIG. 5, when a path from the pooling layer P1 to the fully connected layer F3 is determined, a path from the convolution layer C1 to the pooling layer P1, on the previous stage thereto, is determined. However, when the path from the convolution layer C1 to the pooling layer P1 is a path that is not determined by the path on the subsequent stage as in FIG. 3 and FIG. 4 referred to above, the path extracting means may extract paths between the convolution layer C1 and the convolution layer C2 and between the convolution layer C2 and the pooling layer P1 in the same manner as described above.

In regard to the segment between the convolution layer C1 and the convolution layer C2, the path extracting means may extract the path connecting at least one feature value selected from a plurality of feature values obtained by processing based on the convolution layer C1 and at least one feature value selected from a plurality of feature values obtained by processing based on the convolution layer C2. More specifically, the path extracting means may extract a path connecting at least one feature value selected from a feature value group (first feature value group) including a plurality of feature values obtained by processing based on the plurality of filters of the convolution layer C1 and at least one feature value selected from a feature value group (second feature value group) including a plurality of feature values obtained by processing based on the plurality of filters of the convolution layer C2, and may extract the path by selecting at least two values from at least one of the first feature value group or the second feature value group so that the two values include the maximum value among the plurality of values included in the at least one of the value groups from which selection is made.

In regard to the segment between the convolution layer C2 and the pooling layer P1, the path extracting means may extract the path connecting at least one feature value selected from a plurality of feature values obtained by processing based on the convolution layer C2 and at least one feature value selected from a plurality of feature values obtained by processing based on the pooling layer P1. More specifically, the path extracting means may extract a path connecting at least one feature value selected from a feature value group (second feature value group) including a plurality of feature values obtained by processing based on the plurality of filters of the convolution layer C2 and at least one feature value selected from a feature value group (third feature value group) including a plurality of feature values obtained by processing based on the plurality of filters of the pooling layer P1, and may extract the path by selecting at least two values from at least one of the second feature value group or the third feature value group so that the two values include the maximum value among the plurality of values included in the at least one of the value groups from which selection is made.

The image classification program according to this embodiment causes at least one computer to function as the determination module configured to compare the path extracted by the path extracting means and a plurality of setting paths set in advance in association with classes of images to set a class associated with the matched path as the class of the input image.

The plurality of setting paths are each associated in advance with any one class of, for example, Class 1, Class 2, Class 3, . . . of a plurality of images. The determination module compares the path extracted by the path extracting means and the plurality of setting paths to determine the class associated with the matched path as the class of the input image. The determination module determines that the path that has not been extracted by the path extracting means does not belong to a target class.

Next, a description is given of the image classification system employed when the image classification program according to this embodiment causes a computer to function.

Figure 10:
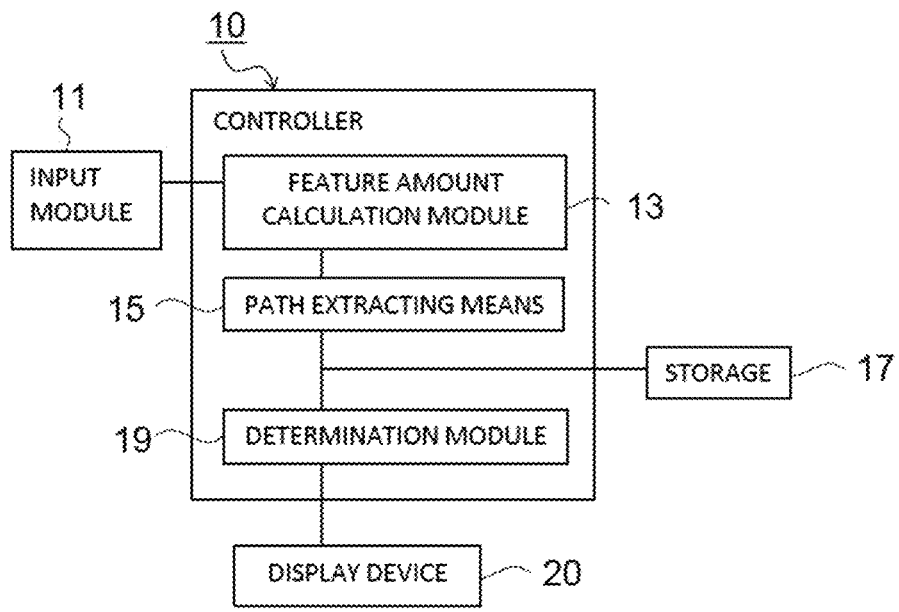
FIG. 10 is a block diagram of an image classification system in the embodiment of the present invention.

As illustrated in FIG. 10, an image classification system 10 in this embodiment is stored in a controller of a computer. The image classification system 10 includes an input module 11, a feature amount calculation module 13, path extracting means 15, a storage 17, and the determination module 19. For example, the image classification system 10 may be stored in the respective controllers of a plurality of computers. The feature amount calculation module 13, the path extracting means 15, and the determination module 19 are stored in a CPU or other such controller of a computer, and the storage 17 is stored in, for example, a server or a hard disk drive.

The input module 11 has a function of receiving the input of image data on an image to be classified and inputting the input image data to the feature amount calculation module 13.

The feature amount calculation module 13 has a function of executing the feature amount extraction processing and the fully connected processing in the convolutional neural network on the image data input from the input module 11. In this embodiment, the feature amount calculation module 13 executes the convolution processing and the pooling processing as the feature amount extraction processing.

In the convolutional neural network illustrated in FIG. 5, the feature amount calculation module 13 of the image classification system 10 scans the input image data D (128×128 pixels in FIG. 5) by, for example, a raster scan for every predetermined pixel size (10×10 pixels in FIG. 5) of a predetermined number of filters (three filters in FIG. 5). Then, the feature amount calculation module 13 performs the known convolution processing on the scanned data, and sets the processing results C1(1), C1(2), . . . as the output data pieces from the first convolution layer C1 (three pieces of image data each having 119×119 pixels in FIG. 5).

The feature amount calculation module 13 performs the known convolution processing on each of the output data pieces C1(1), C1(2), . . . input from the first convolution layer C1 that is the previous layer for every predetermined pixel size (56×56 pixels in FIG. 5) of a predetermined number of filters (eight filters in FIG. 5), and sets the processing results C2(1), C2(2), . . . as the output data pieces from the second convolution layer C2 (eight pieces of image data each having 64×64 pixels in FIG. 5).

The feature amount calculation module 13 scans each of the output data pieces C2(1), C2(2), . . . input from the second convolution layer C2 that is the previous layer (last layer) for every predetermined pixel size (8×8 pixels in FIG. 5). Then, the feature amount calculation module 13 performs the known pooling processing on the scanned data, and sets the processing results P1(1), P2(2), . . . as the output data pieces from the first pooling layer P1 (eight pieces of image data each having 8×8 pixels in FIG. 5). In FIG. 5, only one pooling layer P1 is used as the pooling layer P.

The feature amount calculation module 13 executes the known fully connected processing to perform a product-sum operation on the plurality of output data pieces P1(1), P1(2), . . . input from the first pooling layer P1 that is the previous layer (last layer) by a predetermined number of units (24 units in FIG. 5) while changing the weighting factor, and sets the processing results F1(1), F1(2), . . . as the output data pieces from the first fully connected layer F1 (24 pieces of data).

The feature amount calculation module 13 executes the known fully connected processing to perform a product-sum operation on the plurality of output data pieces F1(1), F1(2), . . . input from the first fully connected layer F1 that is the previous layer by a predetermined number of units (8 units in FIG. 5) while changing the weighting factor, and sets the processing results F2(1), F2(2), . . . as the output data pieces from the second fully connected layer F2 (8 pieces of data).

The feature amount calculation module 13 executes the known fully connected processing to perform a product-sum operation on the plurality of output data pieces F2(1), F2(2), . . . input from the second fully connected layer F2 that is the previous layer by a predetermined number of units (3 units in FIG. 5) while changing the weighting factor, and sets the processing results F3(1), F3(2), . . . as the output data pieces from the third (last) fully connected layer F3 (3 pieces of data). The output data pieces F3(1), F3(2), . . . output from the third fully connected layer F3 correspond to the classification results (in this case, three classes of Class 1, Class 2, and Class 3) of the image.

The path extracting means 15 has a function of extracting the path from the processing results obtained by the feature amount calculation module 13 in the above-mentioned manner.

The storage 17 stores a plurality of setting paths set in advance in association with classes as classification data in the form of a table or the like.

The determination module 19 has a function of reading the classification data stored in the storage 17 and comparing the path extracted from the path extracting means 15 with the classification data to set a class associated with a path that matches the setting path as the class of the input image. The processing result obtained by the determination module 19 is output to a display device 20.

The image classification system 10 in this embodiment is caused by the image classification program according to this embodiment to subject, as described above, input image data to the execution of the feature amount extraction processing and fully connected processing performed by the feature amount calculation module 13, path extracting processing performed by the path extracting means 15, and classification processing for the input image.

Then, the image classification system 10 is caused by the above-mentioned image classification program according to this embodiment to function as the above-mentioned convolutional neural network, the above-mentioned path extracting means, and the determination module to execute the above-mentioned processings.

As described above, the image classification program according this embodiment is a program for classifying an input image, and causes at least one computer to function as: a network constructed so that feature amount extraction processing and fully connected processing are executed on input image data; path extracting means for extracting a processing path in the network; and a determination module configured to compare the processing path extracted by the path extracting means and a plurality of setting paths set in advance in association with classes to set a class associated with a matched path as a class of the input image.

According to the above-mentioned configuration, it is possible to extract a processing path in the above-mentioned network and compare the extracted processing path and a plurality of setting paths set in advance in association with classes to determine a class associated with the matched path as the class of the input image. This enables the classification to be performed with sufficient accuracy.

According to one or more embodiments of the present invention, in the image classification program according to this embodiment, the path extracting means is configured to extract a path connecting at least one feature value selected from a plurality of feature values obtained by the feature amount extraction processing performed in the network and at least one fully connected output value selected from a plurality of fully connected output values obtained by the fully connected processing performed in the network, and at least one of the selected feature value or the selected fully connected output value includes a maximum value.

According to the above-mentioned configuration, the path extracting means extracts the path connecting at least one feature value selected from the plurality of feature values obtained by the feature amount extraction processing performed in the network and at least one fully connected output value selected from the plurality of fully connected output values obtained by the fully connected processing performed in the network, and at least one of the selected feature value or the selected fully connected output value includes a maximum value. This enables an image to be classified with more sufficient accuracy.

According to one or more embodiments of the present invention, in the image classification program according to this embodiment, the path extracting means is configured to extract a path connecting at least one feature value selected from a feature value group including a plurality of feature values obtained by the feature amount extraction processing and at least one fully connected output value selected from a fully connected output value group including a plurality of fully connected output values obtained by the fully connected processing, and to select at least two values from at least one of the feature value group or the fully connected output value group so that the at least two values include a maximum value among a plurality of values included in the at least one of the value groups from which selection is made.

According to the above-mentioned configuration, the path extracting means extracts the path connecting at least one feature value selected from the feature value group including the plurality of feature values obtained by the feature amount extraction processing and at least one fully connected output value selected from the fully connected output value group including the plurality of fully connected output values obtained by the fully connected processing, and selects at least two values from at least one of the feature value group or the fully connected output value group so that the at least two values include the maximum value among the plurality of values included in the at least one of the value groups from which selection is made. This enables an image to be classified with much more sufficient accuracy.

The image classification system 10 configured to execute the above-mentioned image classification program according to this embodiment is applied to various devices, and there is no particular limitation imposed on the devices to which the image classification system 10 is to be applied.

For example, the image classification system 10 can be applied to an inspection device as described below.

Figure 11:
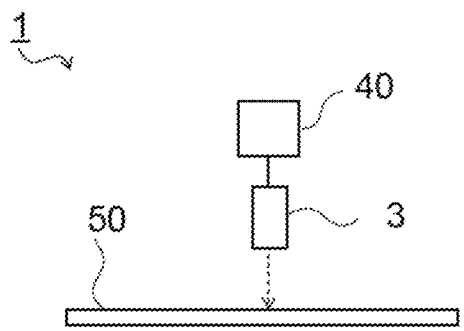
FIG. 11 is a schematic side view of an inspection device to which the image classification program according to this embodiment is applied.

As illustrated in FIG. 11, the inspection device 1 in this embodiment is configured to inspect an object 50 to be inspected for a defect, and includes: an imaging unit 3 capable of capturing an image of the object 50 to be inspected as the image data D; and a classification unit 40 configured to classify the defect based on the image data D captured by the imaging unit 3, and the classification unit 40 includes the image classification system 10 in this embodiment, and is configured to classify the defect by the image classification system 10.

There is no particular limitation imposed on the object to be inspected. For example, examples of the object 50 to be inspected include a sheet. Examples of the sheet include an optical film, a heat shielding film, a heat insulating film, and a UV-blocking film. Examples of the sheet also include a pressure-sensitive adhesive tape including a base material and a pressure-sensitive adhesive layer formed on the base material. Examples of the pressure-sensitive adhesive tape include a pressure-sensitive adhesive tape obtained by forming a pressure-sensitive adhesive layer on only one surface of the above-mentioned base material and a pressure-sensitive adhesive tape obtained by forming pressure-sensitive adhesive layers on both surfaces of the above-mentioned base material.

The imaging unit 3 is capable of capturing the image of the object 50 to be inspected as the image data. There is no particular limitation imposed on the imaging unit 3 as long as the imaging unit 3 is capable of capturing the image of the object 50 to be inspected as the image data. Examples of the imaging unit 3 include a camera.

There is no particular limitation imposed on the defect of the object 50 to be inspected as long as the image of the defect can be captured by the imaging unit 3 as an image having a specific shape. For example, when a sheet is employed as the object 50 to be inspected, a wrinkle (irregularities), a tensile distortion, and a spot-like defect are given as the defects.

The inspection device 1 in this embodiment causes the imaging unit 3 to capture the image of the object 50 to be inspected as the image data, and causes the image classification system 10 to classify the obtained image data, to thereby classify a defect included in the object 50 to be inspected. For example, the defect included in the object 50 to be inspected is classified into any one of Class 1 (for example, wrinkle (irregularities) of a sheet), Class 2 (for example, tensile distortion of a sheet), and Class 3 (for example, spot-like defect).

The classification data for path extraction used in the image classification program according to this embodiment is created by, for example, the following program.

Next, a description is given of the classification data creation program according to this embodiment.

The classification data creation program according to this embodiment is a classification data creation program for creating classification data for an image classification device, and causes at least one computer to function as: a network constructed so that feature amount extraction processing and fully connected processing are executed on input image data; setting path extracting means for extracting, as a setting path, a path connecting at least one feature value selected from a feature value group including a plurality of feature values obtained by the feature amount extraction processing performed in the network and at least one fully connected output value selected from a fully connected output value group including a plurality of fully connected output values obtained by the fully connected processing performed in the network, the at least one feature value and the at least one fully connected output value being selected so that a value selected from at least one of the feature value group or the fully connected output value group includes a maximum value among a plurality of values included in the at least one of the value groups from which selection is made; and association means for associating the extracted setting path and a class for classifying an image with each other.

There is no particular limitation imposed on the image to be classified by the classification data creation program according to this embodiment as long as the image includes a classification target object.

Examples of the network constructed so that the feature amount extraction processing and the fully connected processing are executed on the input image data includes the above-mentioned convolutional neural network.

The classification data creation program according to this embodiment causes a computer to function as the setting path extracting means for extracting a path as a setting path and the association means for associating the extracted setting path with a class for classifying an image.

The setting path extracting means extracts, as a setting path, the path connecting at least one feature value selected from the feature value group including the plurality of feature values obtained by the feature amount extraction processing performed in the network and at least one fully connected output value selected from the fully connected output value group including the plurality of fully connected output values obtained by the fully connected processing performed in the network, the feature value and the fully connected output value being selected so that the value selected from at least one of the feature value group or the fully connected output value group includes the maximum value among the plurality of values included in the at least one of the value groups from which selection is made.

In this case, the feature value is a representative value among the values included in the feature amount obtained by each filter, which enables the comparison with the feature amount obtained by another filter in the same layer, and examples of the feature value include a maximum value, a mean value, and an intermediate value.

Examples of such a setting path include, as indicated by the thick lines in FIG. 6 and FIG. 9: a path connecting the maximum value selected from the feature value group including the plurality of feature values obtained by the feature amount extraction processing and the maximum value selected from the fully connected output value group including the plurality of fully connected output values obtained by the fully connected processing; a path connecting the maximum value selected from the feature value group including the plurality of feature values obtained by the feature amount extraction processing and the second largest value selected from the fully connected output value group including the plurality of fully connected output values obtained by the fully connected processing; a path connecting the second largest value selected from the feature value group including the plurality of feature values obtained by the feature amount extraction processing and the maximum value selected from the fully connected output value group including the plurality of fully connected output values obtained by the fully connected processing; and a path connecting the second largest value selected from the feature value group including the plurality of feature values obtained by the feature amount extraction processing and the second largest value selected from the fully connected output value group including the plurality of fully connected output values obtained by the fully connected processing.

In addition, examples of the above-mentioned setting path include, as indicated by the thick lines in FIG. 7: a path connecting each of the maximum value and the second largest value selected from the feature value group including the plurality of feature values obtained by the feature amount extraction processing and the maximum value selected from the fully connected output value group including the plurality of fully connected output values obtained by the fully connected processing; and a path connecting each of the maximum value and the second largest value selected from the feature value group including the plurality of feature values obtained by the feature amount extraction processing and the second largest value selected from the fully connected output value group including the plurality of fully connected output values obtained by the fully connected processing.

In addition, examples of the above-mentioned setting path include, as indicated by the thick lines in FIG. 8: a path connecting the maximum value selected from the feature value group including the plurality of feature values obtained by the feature amount extraction processing and each of the maximum value and the second largest value selected from the fully connected output value group including the plurality of fully connected output values obtained by the fully connected processing; and a path connecting the second largest value selected from the feature value group including the plurality of feature values obtained by the feature amount extraction processing and each of the maximum value and the second largest value selected from the fully connected output value group including the plurality of fully connected output values obtained by the fully connected processing.

For example, in FIG. 6 to FIG. 9, the setting path extracting means extracts, for example, as the above-mentioned setting path, the path connecting at least one feature value selected from the feature value group including the plurality of feature values obtained by the processing based on the plurality of filters of the pooling layer P1 and at least one fully connected output value selected from the fully connected output value group including the plurality of fully connected output values obtained by the processing based on the plurality of units of the fully connected layer F1, the feature value and the fully connected output value being selected so that a value selected from at least one of the above-mentioned feature value group or the above-mentioned fully connected output value group includes the maximum value among the plurality of values included in the at least one of the value groups from which selection is made.

In addition, in this embodiment, as indicated by the thick lines in FIG. 6 to FIG. 9, the setting path extracting means extracts setting paths between the fully connected layers F, that is, between the fully connected layer F1 and the fully connected layer F2 and between the fully connected layer F2 and the fully connected layer F3, in the same manner as the above-mentioned manner in which the setting path is extracted between the pooling layer P1 and the fully connected layer F1.

In regard to the segment between the fully connected layer F1 and the fully connected layer F2, the setting path extracting means extracts the setting path connecting at least one feature value selected from the fully connected output value group (first fully connected output value group) including the plurality of fully connected output values obtained by the processing based on the plurality of units of the fully connected layer F1 and at least one fully connected output value selected from the fully connected output value group (second fully connected output value group) including the plurality of fully connected output values obtained by the processing based on the plurality of units of the fully connected layer F2 in such a manner that a value selected from at least one of the above-mentioned feature value group or the above-mentioned fully connected output value group includes the maximum value among the plurality of values included in the at least one of the value groups from which selection is made.

In regard to the segment between the fully connected layer F2 and the fully connected layer F3, the setting path extracting means extracts the setting path connecting at least one feature value selected from the fully connected output value group (second fully connected output value group) including the plurality of fully connected output values obtained by the processing based on the plurality of units of the fully connected layer F2 and at least one fully connected output value selected from the fully connected output value group (third fully connected output value group) including the plurality of fully connected output values obtained by the processing based on the plurality of units of the fully connected layer F3 in such a manner that a value selected from at least one of the above-mentioned feature value group or the above-mentioned fully connected output value group includes the maximum value among the plurality of values included in the at least one of the value groups from which selection is made.

It is to be understood that the setting path extracting means may extract a path of another kind.

Further, in the convolutional neural network illustrated in FIG. 5, when a setting path from the pooling layer P1 to the fully connected layer F3 is determined, a setting path from the convolution layer C1 on the stage previous thereto to the pooling layer P1 is determined. However, when the setting path from the convolution layer C1 to the pooling layer P1 is a path that is not determined by the setting path on the subsequent stage as in FIG. 3 and FIG. 4 referred to above, the setting path extracting means may extract setting paths between the convolution layer C1 and the convolution layer C2 and between the convolution layer C2 and the pooling layer P1 in the same manner as described above.

In regard to the segment between the convolution layer C1 and the convolution layer C2, the setting path extracting means may extract the setting path connecting at least one feature value selected from the feature value group (first feature value group) including the plurality of feature values obtained by processing based on the plurality of filters of the convolution layer C1 and at least one feature value selected from the feature value group (second feature value group) including the plurality of feature values obtained by processing based on the plurality of filters of the convolution layer C2 in such a manner that a value selected from at least one of the above-mentioned first feature value group or the above-mentioned second feature value group includes the maximum value among the plurality of values included in the at least one of the value groups from which selection is made.

In regard to the segment between the convolution layer C2 and the pooling layer P1, the setting path extracting means may extract the setting path connecting at least one feature value selected from the feature value group (second feature value group) including the plurality of feature values obtained by processing based on the plurality of filters of the convolution layer C2 and at least one feature value selected from the feature value group (third feature value group)

including the plurality of feature values obtained by processing based on the plurality of filters of the pooling layer P1 in such a manner that a value selected from at least one of the above-mentioned second feature value group or the above-mentioned third feature value group includes the maximum value among the plurality of values included in the at least one of the value groups from which selection is made.

The association means associates the setting path extracted by the setting path extracting means and the class for classifying an image with each other. The association means associates each of the plurality of setting paths in advance with any one of the classes, for example, Class 1, Class 2, Class 3, . . . , of a plurality of images. The classification data is created through the above-mentioned association.

Next, a description is given of a classification data creation system employed when the program of this embodiment causes a computer to function.

Figure 12:
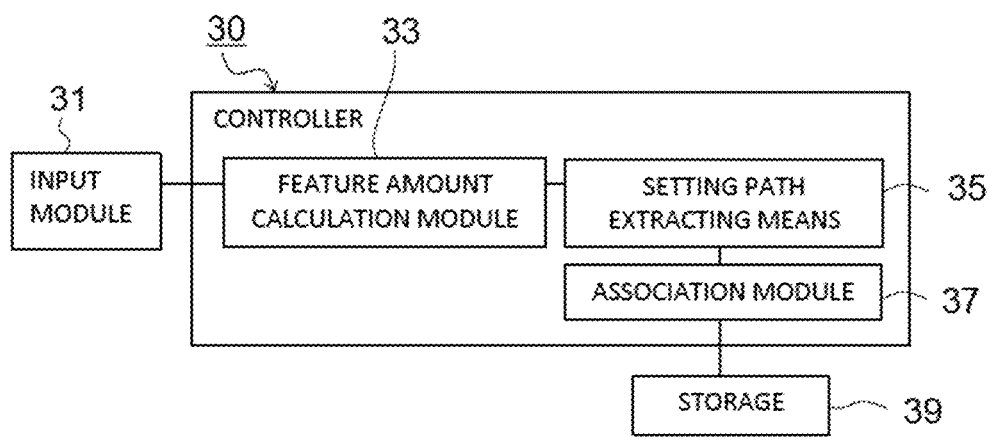
FIG. 12 is a block diagram for illustrating processing executed by a classification data creation program according to the embodiment of the present invention.

As illustrated in FIG. 12, a classification data creation system 30 in this embodiment is stored in a controller of a computer. The classification data creation system 30 includes an input module 31, a feature amount calculation module 33, setting path extracting means 35, an association module 37, and a storage 39. The feature amount calculation module 33, the setting path extracting means 35, and the association module 37 are stored in a CPU or other such controller of a computer, and the storage 39 is stored in, for example, a server or a hard disk drive.

The input module 31 has a function of receiving the input of image data on an image to be classified and inputting the input image data to the feature amount calculation module 33.

The feature amount calculation module 33 has a function of executing the feature amount extraction processing and the fully connected processing, which are performed in the convolutional neural network, on the image data input from the input module 31. In this embodiment, the feature amount calculation module 33 executes the convolution processing and the pooling processing as the feature amount extraction processing. In this embodiment, the feature amount calculation module 33 has the same function as that of the feature amount calculation module 13 described above, and executes the same processing.

The setting path extracting means 35 has a function of extracting the setting path from the processing results obtained by the feature amount calculation module 33 in the above-mentioned manner.

The association module 37 has a function of creating the classification data by associating the setting path extracted by the setting path extracting means 35 with the above-mentioned class.

The storage 39 stores the created classification data in the form of a table or the like.

The classification data creation system 30 in this embodiment is caused by the classification data creation program according to this embodiment to subject, as described above, input image data to the execution of the feature amount extraction processing and fully connected processing performed by the feature amount calculation module 33, the setting path extracting processing performed by the setting path extracting means 35, the association of the setting path with the class performed by the association module 37, and the storage of the classification data performed by the storage 39.

As described above, the classification data creation program according to this embodiment is a classification data creation program for creating classification data for an image classification device, and causes at least one computer to function as: the network constructed so that the feature amount extraction processing and the fully connected processing are executed on the input image data; the setting path extracting means for extracting, as a setting path, the path connecting at least one feature value selected from the feature value group including the plurality of feature values obtained by the feature amount extraction processing performed in the network and at least one fully connected output value selected from the fully connected output value group including the plurality of fully connected output values obtained by the fully connected processing performed in the network, the feature value and the fully connected output value being selected so that a value selected from at least one of the feature value group or the fully connected output value group includes the maximum value among the plurality of values included in the at least one of the value groups from which selection is made; and the association means for associating the extracted setting path and the class for classifying an image with each other.

According to the above-mentioned configuration, it is possible to extract, as a setting path, the path connecting at least one feature value selected from the feature value group including the plurality of feature values obtained by the feature amount extraction processing performed in the network and at least one fully connected output value selected from the fully connected output value group including the plurality of fully connected output values obtained by the fully connected processing performed in the network, the feature value and the fully connected output value being selected so that a value selected from at least one of the feature value group or the fully connected output value group includes the maximum value among the plurality of values included in the at least one of the value groups from which selection is made, and to associate the extracted setting path and the class for classifying an image with each other. With this configuration, it is possible to obtain the classification data that enables an image to be classified with sufficient accuracy. Therefore, the use of the classification data enables an image to be classified with sufficient accuracy.

Next, a description is given of the classification data creation method using the classification data creation system caused to function by the classification data creation program according to this embodiment.

The classification data creation method according to this embodiment is carried out through use of the classification data creation system of this embodiment described above.

Specifically, the classification data creation method according to this embodiment is a method of creating classification data for an image classification device. The classification data creation method includes: a network processing step of executing feature amount extraction processing and fully connected processing on input image data; extracting, as a setting path, a path connecting at least one feature value selected from a feature value group including a plurality of feature values obtained by the feature amount extraction processing performed in the network processing step and at least one fully connected output value selected from a fully connected output value group including a plurality of fully connected output values obtained by the fully connected processing performed in the network processing step, the at least one feature value and the at least one fully connected output value being selected so that a value selected from at least one of the feature value group or the fully connected output value group includes a maximum value among a plurality of values included in the at least one of the value groups from which selection is made; and associating the extracted setting path and a class for classifying an image with each other.

In the network processing step, the feature amount extraction processing and the fully connected processing are carried out by feature amount extracting means and fully connected processing means, which have been described above.

In the extracting of the path as the setting path, the setting path is extracted by the above-mentioned setting path extracting means in the above-mentioned manner.

In the associating of the extracted setting path and the class with each other, the setting path extracted in the above-mentioned manner and the class for classifying an image are associated with each other to create the classification data by the above-mentioned association means.

According to the above-mentioned classification data creation method of this embodiment, it is possible to extract, as a setting path, the path connecting at least one feature value selected from the feature value group including the plurality of feature values obtained by the feature amount extraction processing performed in the network and at least one fully connected output value selected from the fully connected output value group including the plurality of fully connected output values obtained by the fully connected processing performed in the network, the feature value and the fully connected output value being selected so that a value selected from at least one of the feature value group or the fully connected output value group includes the maximum value among the plurality of values included in the at least one of the value groups from which selection is made, and to associate the extracted setting path and the class for classifying an image with each other. With this configuration, it is possible to obtain the classification data that enables an image to be classified with sufficient accuracy. Therefore, the use of the classification data enables an image to be classified with sufficient accuracy.

As described above, according to this embodiment, there are provided the image classification program, the image classification system, the classification data creation program, the classification data creation system, and the classification data creation method, which enable the classification to be performed with sufficient accuracy.

The image classification program, the image classification system, the classification data creation program, the classification data creation system, and the classification data creation method according to this embodiment are as described above, but the present invention is not limited to the above-mentioned embodiment, and it is possible to change the design appropriately.

Now, the present invention is described in more detail with reference to Examples, but the present invention is not limited to those Examples.

EXAMPLES

In order to classify an image as any one of the following defects by using image data obtained by capturing an image of a sheet as the image data, in the image classification system illustrated in FIG. 10, data for training was used to construct a convolutional neural network for executing the feature amount extraction processing and the fully connected processing, which are illustrated in FIG. 5.

Class 1: wrinkle (irregularities)
Class 2: tensile distortion
Class 3: spot-like defect As the data for training, 996 pieces of image data having a defect of Class 1, 1,000 pieces of image data having a defect of Class 2, and 144 pieces of image data having a defect of Class 3 were used. Then, 500 pieces of image data having a defect of Class 1, 4,802 pieces of image data having a defect of Class 2, and 298 pieces of image data having a defect of Class 3 were provided as the image data for evaluation separately from the data for training, and the constructed convolutional neural network was used to classify those pieces of image data for evaluation and examine classification accuracy thereof.

Comparative Example 1

In the constructed convolutional neural network, the respective kinds of processing were executed on the path passing through all the paths from the pooling processing performed in the pooling layer P1 to the fully connected processing performed in the fully connected layer F3, and processing results finally obtained from the fully connected layer F3 were output as correlation values of Classes 1 to 3 (such correlation values that a sum of the three correlation values is one). The results are shown in Table 1.

TABLE 1

| Class | Correlation value |
| --- | --- |
| Class 1 (irregularities) | 0.86 |
| Class 2 (tensile distortion) | 0.07 |
| Class 3 (spot-like defect) | 0.06 |

In Table 1, when the classification processing was again performed on the image data for evaluation with a threshold value set to 0.5, the number of pieces of image data overlooked in Class 2 (pieces of image data that are to be classified as Class 2 originally but were not classified as Class 2 actually) was 9 out of 4,802, thereby exhibiting a classification accuracy of 99.43%.

Example 1

In the constructed convolutional neural network, after the data for training of each of Classes 1 to 3 was used to execute the feature amount extraction processing and the fully connected processing one time each, a path connecting the maximum value of the feature values obtained by the feature amount extraction processing using the data for training of each class and the maximum value of the fully connected output values obtained by the fully connected processing using the data for training of each class was extracted as the setting path, and the extracted path and each corresponding class are associated with each other to be set as the classification data. More specifically, as indicated by the thick lines in FIG. 6 referred to above, a path connecting the maximum value among a plurality of feature values (feature value group) obtained by the processing performed in the pooling layer P1 and the maximum value among a plurality of fully connected output values (fully connected output value group) obtained by the processing performed in the fully connected layer F1 and connecting the maximum value among the plurality of fully connected output values (fully connected output value group) obtained by the processing performed in the fully connected layer F1 and the maximum value among a plurality of fully connected output values (fully connected output value group) obtained by the processing performed in the fully connected layer F2 was extracted as a setting path for each of Classes 1 to 3.

The classification data obtained in this manner is stored in the storage of the image classification system. In FIG. 5, the convolution layer C1 is the first convolution layer, which causes no difference in feature amount among the classes. It is also apparent that the same path is followed in the convolution layer C1, the convolution layer C2, and the pooling layer P1, and the fully connected layer F3 is the last layer. Therefore, when a path connecting the layer P1, the layer F1, and the layer F2 is determined, a path connecting those layers C1, C2, P1, and F3 is determined accordingly. In this respect, the extracted setting path corresponds to the path connecting the maximum values obtained by all kinds of processing within the feature extracting processing. The path connecting the maximum values in the above-mentioned manner is defined as Formula (1). In Formula (1), MAX( ) represents a filter number (processing number) and a unit number (processing number) that take maximum values.

$$\text{Route}=[\text{Max}(C1),\text{Max}(C2),\text{Max}(P1),\text{Max}(F1),\text{Max}(F2),\text{Max}(F3)] \quad (1)$$

Figure 13:
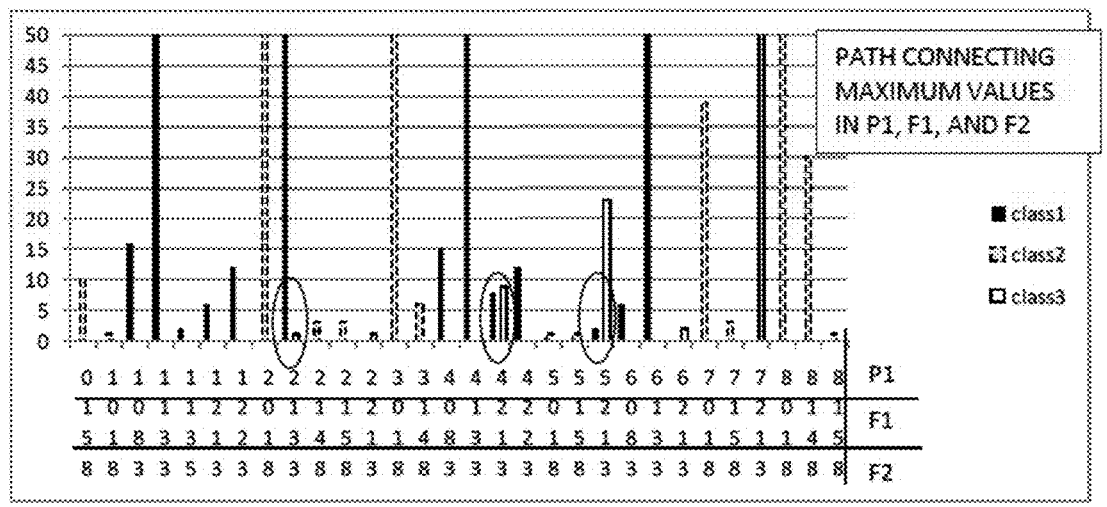
FIG. 13 is a graph for showing a result of Example 1.

For example, the path indicated by the thick line in FIG. 6 is a path defined as Route[1, 2, 2, 3, 2, 1], and indicates that the path passes through the layer C1(1), the layer C2(2), the layer P1(2), the layer F1(3), the layer F2(2), and the layer F3(1). Then, the image data for evaluation was input to the image classification system, and the feature amount extraction processing and the fully connected processing were executed thereon to examine which one of Classes 1 to 3 the input image data for evaluation was classified as. The results are shown in FIG. 13. In FIG. 13, the horizontal axis represents a pattern of Route, and the vertical axis represents a frequency. In FIG. 13, on the horizontal axis for the F1 layer, the tens digit is shown in the upper row and the ones digit is shown in the lower row. In FIG. 13, when the value of the processing result obtained by each of the filters and units in the respective layers is zero, the processing number is set to "0". That is, none of the filters and the units is inactive, which means that there is no difference no matter which one of the filters and the units is followed.

As shown in FIG. 13, it was verified that 28 patterns of paths were present and a specific path was followed for each class. It was also found that the same paths were followed for Class 1 and Class 3 on paths defined as Route[2, 13, 3], Route[4, 21, 3], and Route[5, 21, 3] among the paths from the layer P1 to the layer F2.

Therefore, in order to suppress overlooking due to the above-mentioned overlap, of the above-mentioned 28 paths, paths determined as only Class 1 were set as setting paths associated with Class 1, paths determined as only Class 3 were set as setting paths associated with Class 3, and the other paths were set as setting paths associated with Class 2. The classification data determined in this manner was stored in the storage, and the feature amount extraction processing and the classification processing were again executed on the image data for evaluation by the image classification system to examine which one of Classes 1 to 3 the input image data for evaluation was classified as. As a result, the number of overlooked pieces of image data was 4 out of 4,802 pieces of image data to be classified as Class 2. In addition to the above-mentioned path connecting the respective maximum values among the paths from the layer P1 to the layer F2, a path from the layer P1 to the layer F2 was also set in the segment from the layer P1 to the layer F2 so as to pass through the maximum values in the layer F1 and the layer F2 and pass through each of the second largest value and the third largest value in the layer P1. As a result, the number of overlooked pieces of image data was zero. At that time, the classification accuracy was 98.88%. That is, it is possible to perform the classification without causing the overlooking (with a zero count of overlooking) while maintaining substantially the same classification accuracy as that of Comparative Example 1.

Example 2

Figure 14:
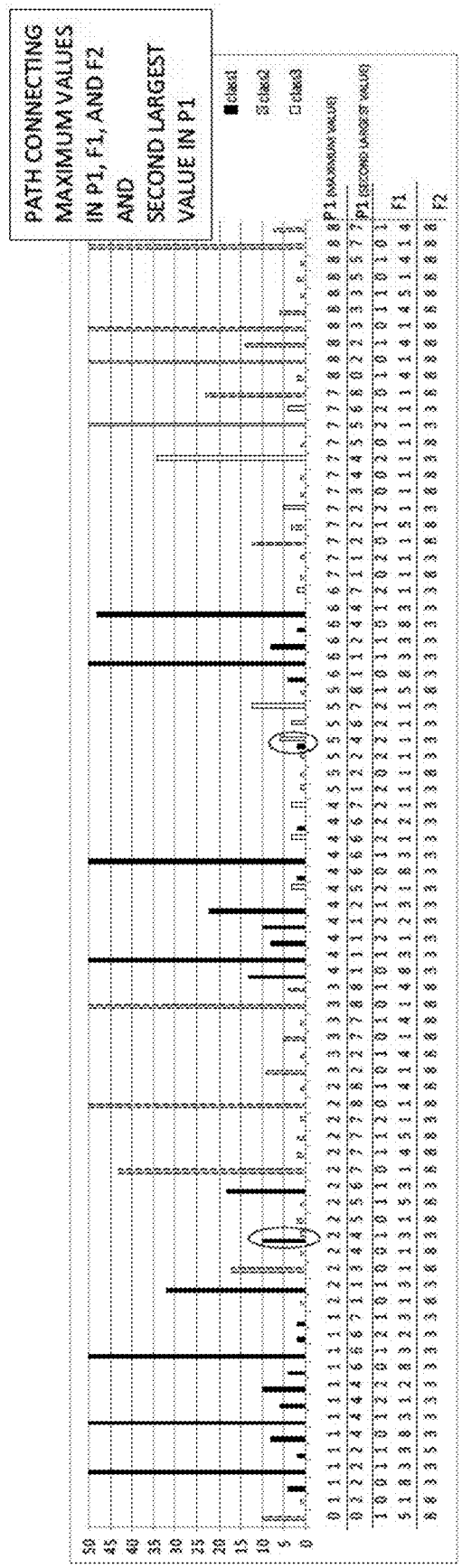
FIG. 14 is a graph for showing a result of Example 2.

In the constructed convolutional neural network, after the data for training of each of Classes 1 to 3 was used to execute the feature amount extraction processing and the fully connected processing one time each, a path connecting each of the maximum value and the second largest value obtained by the feature amount extraction processing using the data for training of each class and the maximum value obtained by the fully connected processing using the data for training of each class was extracted, and the extracted path and each corresponding class are associated with each other to be set as the setting path. Specifically, as indicated by the thick lines in FIG. 7 referred to above, a path connecting each of the maximum value and the second largest value among the plurality of feature values (feature value group) obtained by the processing performed in the pooling layer P1 and the maximum value among the plurality of fully connected output values (fully connected output value group) obtained by the processing performed in the fully connected layer F1 and connecting the maximum value among the plurality of fully connected output values (fully connected output value group) obtained by the processing performed in the fully connected layer F1 and the maximum value among the plurality of fully connected output values (fully connected output value group) obtained by the processing performed in the fully connected layer F2 was extracted as a setting path for each of Classes 1 to 3. In other respects, in the same manner as in Example 1, the image data for evaluation was input to the image classification system, and the feature amount extraction processing and the fully connected processing were executed thereon to examine which one of Classes 1 to 3 the input image data for evaluation was classified as. The results are shown in FIG. 14.

Example 3

Figure 15:
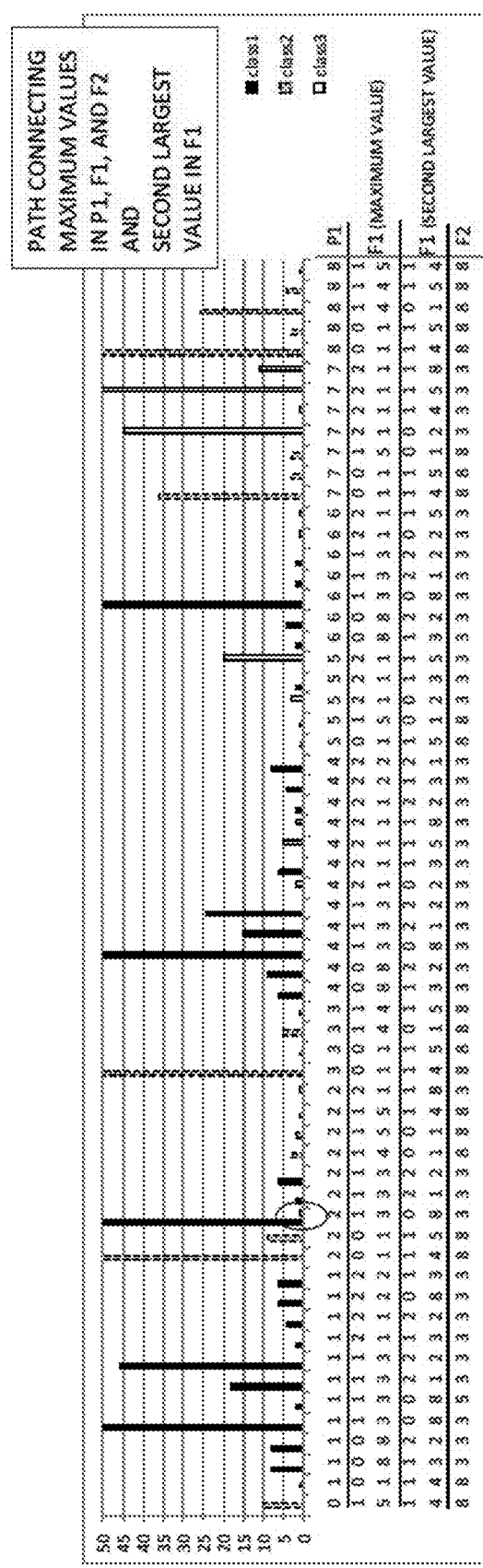
FIG. 15 is a graph for showing a result of Example 3.

In the constructed convolutional neural network, after the data for training of each of Classes 1 to 3 was used to execute the feature amount extraction processing and the fully connected processing one time each, a path connecting the maximum value of the feature values obtained by the feature amount extraction processing using the data for training of each class and each of the maximum value and the second largest value of the fully connected output values obtained by the fully connected processing using the data for training of each class was extracted, and the extracted path and each corresponding class are associated with each other to be set as the setting path. Specifically, as indicated by the thick lines in FIG. 8 referred to above, a path connecting the maximum value among the plurality of feature values (feature value group) obtained by the processing performed in the pooling layer P1 and each of the maximum value and the second largest value among the plurality of fully connected output values (fully connected output value group) obtained by the processing performed in the fully connected layer F1 and connecting each of the maximum value and the second largest value among the plurality of fully connected output values (fully connected output value group) obtained by the processing performed in the fully connected layer F1 and the maximum value among the plurality of fully connected output values (fully connected output value group) obtained by the processing performed in the fully connected layer F2 was extracted as a setting path for each of Classes 1 to 3. In other respects, in the same manner as in Example 1, the image data for evaluation was input to the image classification system, and the feature amount extraction processing and the fully connected processing were executed thereon to examine which one of Classes 1 to 3 the input image data for evaluation was classified as. The results are shown in FIG. 15.

Example 4

Figure 16:
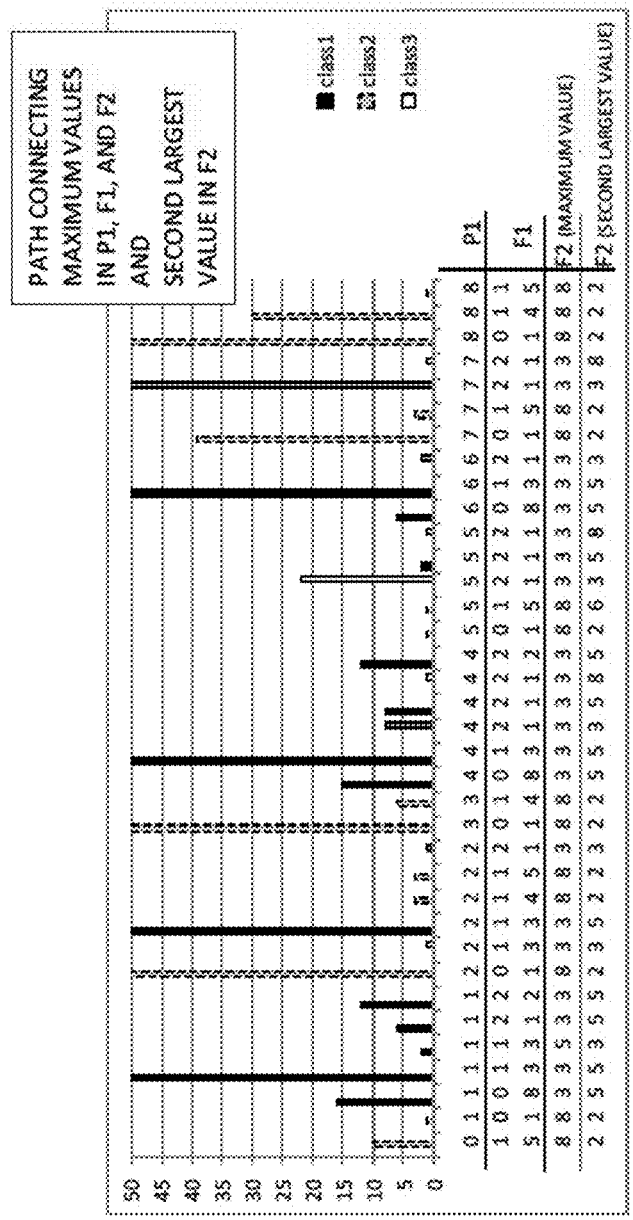
FIG. 16 is a graph for showing a result of Example 4.

In the constructed convolutional neural network, after the data for training of each of Classes 1 to 3 was used to execute the feature amount extraction processing and the fully connected processing one time each, a path connecting the maximum value of the feature values obtained by the feature amount extraction processing using the data for training of each class and each of the maximum value and the second largest value of the fully connected output values obtained by the fully connected processing using the data for training of each class was extracted, and the extracted path and each corresponding class are associated with each other to be set as the setting path. Specifically, as indicated by the thick lines in FIG. 9 referred to above, a path connecting the maximum value among the plurality of feature values (feature value group) obtained by the processing performed in the pooling layer P1 and the maximum value among the plurality of fully connected output values (fully connected output value group) obtained by the processing performed in the fully connected layer F1 and connecting the maximum value among the plurality of fully connected output values (fully connected output value group) obtained by the processing performed in the fully connected layer F1 and each of the maximum value and the second largest value among the plurality of fully connected output values (fully connected output value group) obtained by the processing performed in the fully connected layer F2 was extracted as a setting path for each of Classes 1 to 3. In other respects, in the same manner as in Example 1, the image data for evaluation was input to the image classification system, and the feature amount extraction processing and the fully connected processing were executed thereon to examine which one of Classes 1 to 3 the input image data for evaluation was classified as. The results are shown in FIG. 16.

As shown in FIG. 13 to FIG. 16, the number of paths classified as a plurality of classes became smaller in Examples 2 to 4 than in Example 1.

The embodiments and Examples of the present invention have been described above, but variations obtained by appropriately combining the features of the embodiments and Examples are also originally planned. It is also to be considered that the embodiments and Examples disclosed herein are merely examples in every respect, and the present invention is not limited thereto. The scope of the present invention is defined by the appended claims rather than the embodiment and Examples described above, and is intended to include all modifications within the meaning and scope equivalent to the appended claims.

What is claimed is:

1. An image classification system for classifying an input image, the image classification system comprising:
    a processor; and
    a storage,
    wherein the processor stores a neural network that outputs an identification result of a class to which input image data belongs,
    wherein the neural network comprises:
        a feature amount extraction layer for executing feature amount extraction processing in which a plurality of feature values are extracted from the input image data; and
        at least one fully connected layer for executing fully connected processing in which a plurality of fully connected output values are obtained based on the plurality of feature values extracted by the feature amount extraction processing,
    wherein the feature amount extraction layer comprises a plurality of layers each formed of a plurality of filters,
    wherein each of the at least one fully connected layer comprises a plurality of units,
    wherein the processor is configured to execute the feature amount extraction processing by the feature amount extraction layer and the fully connected processing by the at least one fully connected layer to output the identification result, and is configured to extract a processing path that connects a filter, among the plurality of filters forming each of the plurality of layers of the feature amount extraction layer, that has been passed through in the feature amount extraction processing when a class of an image to be classified that has been input into the neural network is identified and a unit, among the plurality of units forming the at least one fully connected layer, that has been passed through in the fully connected processing when a class of an image to be classified that has been input into the neural network is identified,
    wherein the storage stores classes of a plurality of images for learning identified by the neural network, and a plurality of setting paths in association individually with the respective classes of the plurality of images for learning,
    wherein each of the plurality of setting paths is a path that connects a filter, among the plurality of filters forming each of the plurality of layers of the feature amount extraction layer, that has been passed through in the feature amount extraction processing when the neural network identifies the class of the image for learning and a unit, among the plurality of units of the at least one fully connected layer, that has been passed through in the fully connected processing when the neural network identifies the class of the image for learning, and
    wherein the processor is configured to compare the processing path and the plurality of setting paths to set the class of the image for learning associated with a setting path coinciding with the processing path among the plurality of setting paths, as a class of the input image.

2. The image classification system according to claim 1, wherein each of the plurality of setting paths is a path connecting at least one feature value selected from a plurality of feature values obtained by the feature amount extraction processing performed in the neural network when the class of the image for learning is identified and at least one fully connected output value selected from a plurality of fully connected output values obtained by the fully connected processing performed in the neural network when the class of the image for learning is identified, and wherein at least one of the selected at least one feature value or the selected at least one fully connected output value includes a maximum value.

3. The image classification system according to claim 1, wherein each of the plurality of setting paths is a path connecting at least one feature value selected from a feature value group including a plurality of feature values obtained by the feature amount extraction processing performed in the neural network when the class of the image for learning is identified and at least one fully connected output value selected from a fully connected output value group including a plurality of fully connected output values obtained by the fully connected processing performed in the neural network when the class of the image for learning is identified, wherein the processor is configured to select at least two values from at least one of the feature value group or the fully connected output value group, and wherein the at least two values include a maximum value among a plurality of values included in the at least one of the value groups from which selection is made.

4. A non-transitory storage medium for storing a program configured to cause at least one computer to function as the image classification system according to claim 1.

\* \* \* \* \*